(12) United States Patent
Gerwig et al.

(10) Patent No.: US 7,873,687 B2
(45) Date of Patent: Jan. 18, 2011

(54) METHOD FOR CALCULATING A RESULT OF A DIVISION WITH A FLOATING POINT UNIT WITH FUSED MULTIPLY-ADD

(75) Inventors: Guenter Gerwig, Simmozheim (DE); Holger Wetter, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 1026 days.

(21) Appl. No.: 11/458,405

(22) Filed: Jul. 19, 2006

(65) Prior Publication Data

US 2007/0083583 A1 Apr. 12, 2007

(51) Int. Cl.
G06F 7/487 (2006.01)

(52) U.S. Cl. .................................... 708/504
(58) Field of Classification Search ........ None
See application file for complete search history.

(56) References Cited

U.S. PATENT DOCUMENTS

| | | | | |
|---|---|---|---|---|
| 5,515,308 | A * | 5/1996 | Karp et al. | 708/500 |
| 6,751,645 | B1 * | 6/2004 | Gorshtein et al. | 708/650 |
| 2006/0179092 | A1 * | 8/2006 | Schmookler | 708/204 |
| 2006/0184601 | A1 * | 8/2006 | Trong et al. | 708/495 |
| 2008/0275931 | A1 * | 11/2008 | Schmookler | 708/501 |

OTHER PUBLICATIONS

G. Gerwig et al. "The IBM eServer z990 Floating-Point Unit", IBM Journal of Research and Development, vol. 48, No. 3/4, May /Jul. 2004. pp. 311-322.
IBM z/Architecture Principles of Operation, SA22-7832-03, 4th Edition, May 2004.

* cited by examiner

Primary Examiner—David H Malzahn
(74) Attorney, Agent, or Firm—Steven Chiu

(57) ABSTRACT

The invention proposes a Floating Point Unit with fused multiply-add, with one addend Method for calculating a result of a division with an A-register and a B-register for two multiplicand operands and a C-register for an addend operand, wherein a divide processor using a subtractive method for calculation with a divisor register and a partial remainder register and a multiplier associated to an subtractor uses the C-register as input, wherein while loading the fraction of the dividend through the divisor register into the partial remainder register of the divide processor a calculated shifting is applied for alignment by using the multiplier associated to the subtractor.

5 Claims, 2 Drawing Sheets

METHOD FOR CALCULATING A RESULT OF A DIVISION WITH A FLOATING POINT UNIT WITH FUSED MULTIPLY-ADD

BACKGROUND OF THE INVENTION

The present invention relates to a method for calculating a result of a division with a Floating-point Unit with fused multiply-add dataflow structure and a separate subtraction based divide processor.

A floating point unit with a fused multiply-add dataflow is described in G. Gerwig et. al. "The IBM eServer z990 floating point unit", IBM J. Res. & Dev., Vol. 48, No. 3/4, 2004. Part of the function of this floating point unit is to calculate hexadecimal divide instructions. DD, DE, DER, DER, DXR are examples as defined in the z/Architecture Principles of Operation (IBM SA 22-7832).

A dividend D is divided by a divisor V getting the quotient Q as result, the quotient is built by normalization and rounding of the raw quotient according to the equation:

$$Q = \text{Round}(\text{Norm}(D:V)).$$

The normalization is done in steps of 4 bits (=1 hexadecimal digit). The rounding is done by truncation (round to zero).

In the following examples a width of 32 bit is assumed, 64 or 128 bits are also common.

For basic division the SRT-Algorithm is used, which is named after Sweeney, Robertson and Toucher, who independently proposed the algorithm.

For that Method it is required that the Divisor is bit-normalized, to guarantee convergence of the method. Normalization of the Dividend may be useful, but is not required, as long as the full width of the Dividend is considered for the computation. There is an degree of freedom to choose the alignment of the Dividend. Part of the invention is to use this for getting the quotient prealigned to avoid an extra post processing step for hexadecimal alignment.

For the SRT divide algorithm, the Partial Remainder for the next iteration is calculated with the following iteration:

$$P_{i+1} = (r*P_i) - q_{i+1}*V$$

Where $P_i$, is the Partial reminder in iteration i and r is the radix of the SRT algorithm (r=4 in the shown example). The resulting Quotient is the concatenation of all 1 ... n partial quotient digits $q_i$. The first partial quotient $q_0$ is placed in the most significant position of the quotient register. The next lower quotient digit $q_1$ is concatenated right to that and so on, until the final width is reached.

The number of iterations depends on the radix of the SRT division and the width of the quotient. In our example we have a radix of 4 and width of the raw quotient of 24+4. The "+4" are needed because of one guard digit has to be considered.

So there would 13 iterations be needed to calculate the raw quotient for a 24 bit-wide HFP operand fraction.

SUMMARY OF THE INVENTION

It is therefore an object of the invention to provide a method which allows an improved division operation by using a Floating Point Unit with fused multiply add wherein the division operation is performed faster.

The invention's technical purpose is for calculating a result of a division with a Floating Point Unit with fused multiply add with an A-register and a B-register for two multiplicand operands and a C-register for an addend operand, wherein a divide processor using a subtractive method for calculation with a divisor register and a partial remainder register and a multiplier associated to an subtractor uses the C-register as input, which comprises the following steps:

normalization of the dividend and the divisor of the division calculation, loading the C-register with the bit-normalized dividend and divisor while calculating in parallel a shift correction for alignment of the dividend by a control logic, loading the fraction of the dividend through the divisor register into the partial remainder register of the divide processor while applying the calculated shifting for alignment by using the multiplier associated to the subtractor, loading the fraction of the divisor into the divisor register, performing a division calculation by the divide processor by the required number of iterations, loading the redundant parts of remainder and quotient into the main adder of the Floating Point Unit and build the explicit raw quotient result, which is already hexadecimal normalized.

The invention shows a way, how the alignment can be done in parallel to the normal divide operation. with that the performance can be improved considerably. In state of the art implementations the hexadecimal alignment after calculating the raw result requires additional cycles.

In a preferred embodiment of the invention said shift correction is a shift to the left in the register by 0 up to 3 bits.

Another preferred embodiment of the invention proposes that the amount of left shifting is derived from the calculation of the equation:

$$n\_sl = \text{Mod4}(\text{const} + n\_d - n\_V),$$

wherein 'n_sl' is the number of required left shifts in the range of 0, 1, 2, 3;

'n_d' is the amount of leading '0's of the dividend;

'n_v' is the amount of leading '0's of the divisor,;

'const' is a constant is a value that ensures that 'n_sl' is always a positive value.

In a preferred embodiment of the invention said constant is chosen with the value of the width of the fraction operand (i.e. the width is 24 or 56).

The foregoing, together with other objects, features, and advantages of this invention can be better appreciated with reference to the following specification, claims and drawings.

BRIEF DESCRIPTION OF THE DRAWINGS

The present invention and its advantages are now described in conjunction with the accompanying drawings.

DETAILED DESCRIPTION

Equal reference signs in the description designate the same or equivalent elements.

Figure 1:
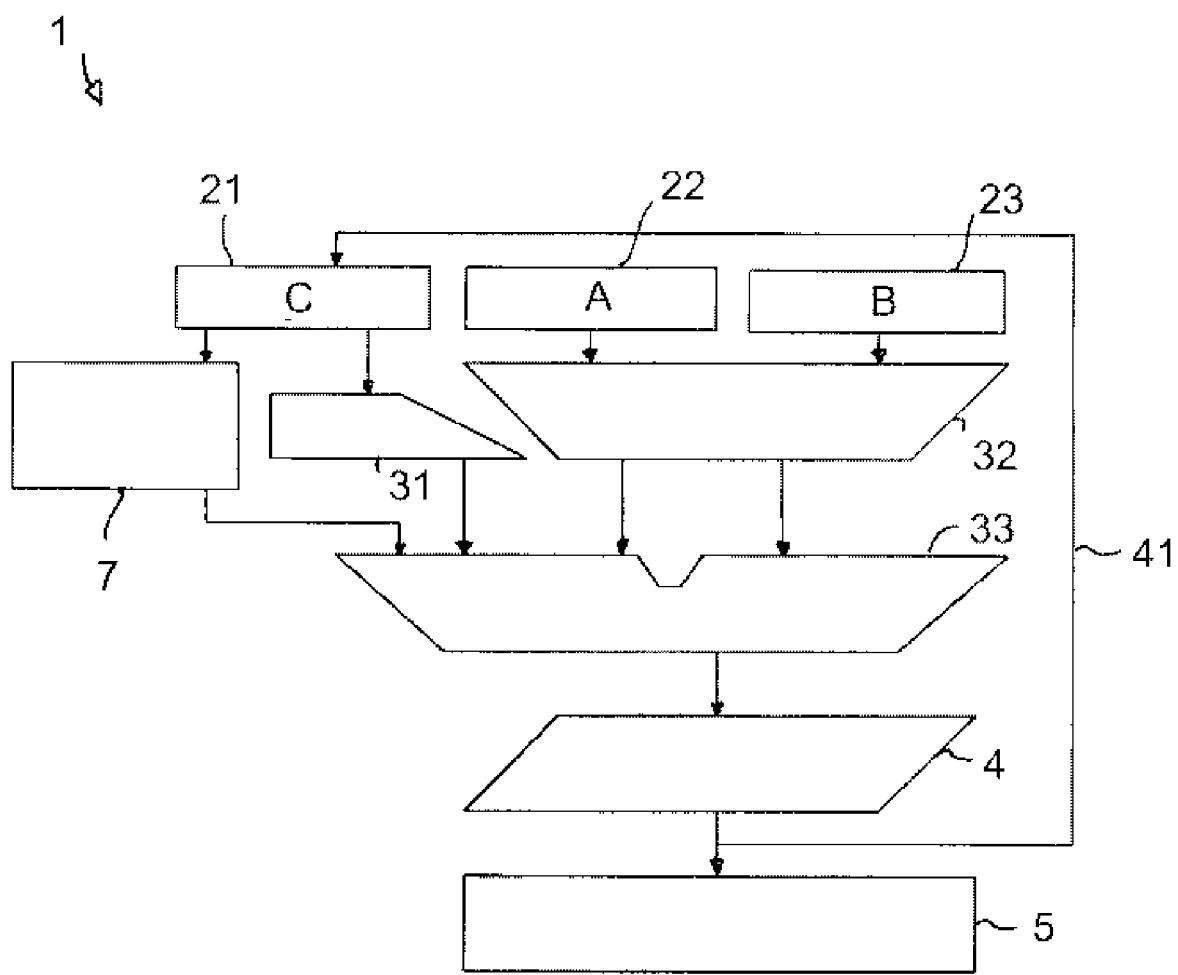
FIG. 1 is showing a scheme of a Floating Point Unit, which is used according to the invention.

FIG. 1 depicts a Floating Point Unit (FPU) 1 with fused multiply add with an A-register 22 and a B-register 23 for two multiplicand operands and a C-register 21 for an addend operand. The FPU has divide processor 7 using a subtractive method for calculation and is fed by the C-register 21.

Further the FPU has a multiplier stage 32, a main adder stage 33, an alignment stage 31, a normalizer 4, and a rounder/reformatter 5 that outputs the result.

Figure 2:
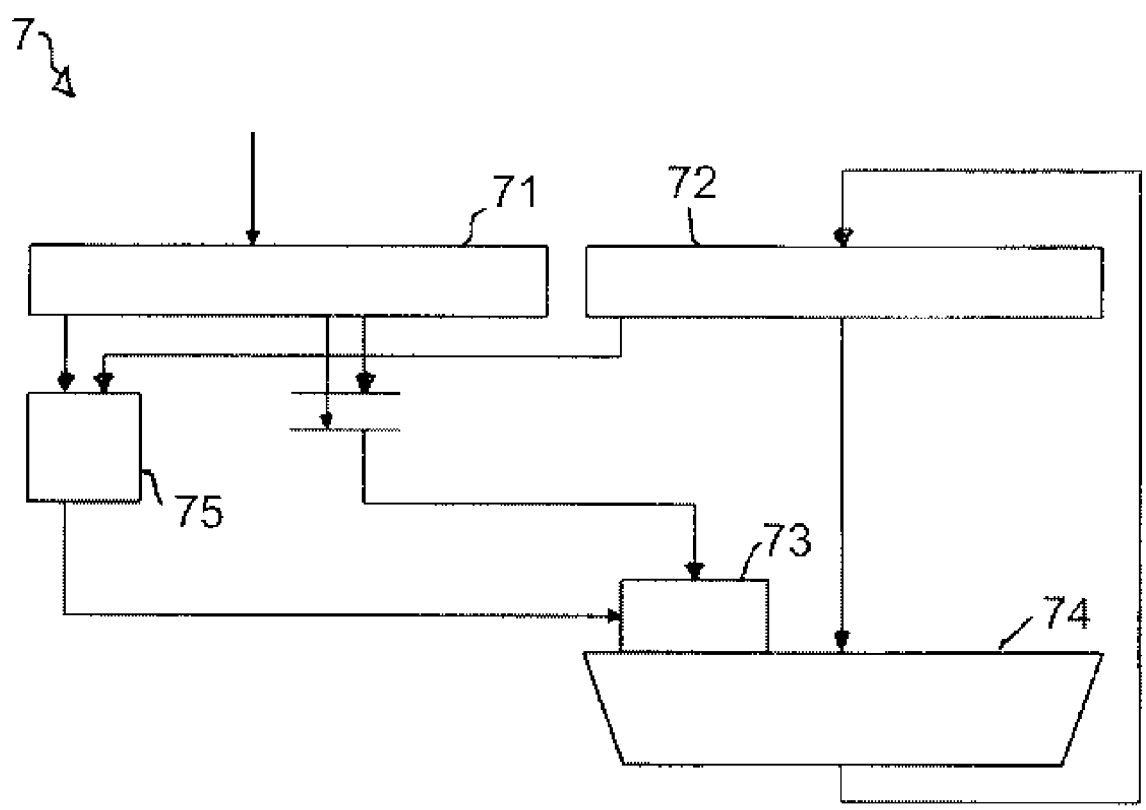
FIG. 2 is showing a scheme of the divide processor of the floating Point Unit shown in FIG. 1.

FIG. 2 depicts a scheme of the divide processor 7 of the FPU shown in FIG. 1, which uses the C-register 21 as input. For calculation it provides a divisor register 71 and a partial remainder register 72 and a multiplier 73 associated to an subtractor 74.

The division according to the invention is done by the steps:

- normalization of the dividend and the divisor of the division calculation,
- loading the C-register 21 with the bit-normalized dividend and divisor while calculating in parallel a shift correction for alignment of the dividend by a control logic,
- loading the fraction of the dividend through the divisor register 71 into the partial remainder register 72 of the divide processor 7 while applying the calculated shifting for alignment by using the multiplier 73 associated to the subtractor 74,
- loading the fraction of the divisor into the divisor register,
- performing a division calculation by the divide processor 7 by the required number of iterations,
- loading the redundant parts of remainder and quotient into the main adder 33 of the Floating Point Unit and build the explicit raw quotient result, which is already hexadecimal normalized.

The main step of the invention is that when the fraction of the dividend is moved from the divisor register 71 into the partial remainder register 72, the available multiplication is used to do the required shifting.

The extra cycles for the hexadecimal floating point (HFP) alignment as required in the state of the art can be avoided by using the method according to the invention, wherein the dividend is loaded into the divide processor in a way to get directly a hexadecimal aligned raw quotient. The remaining pure HFP normalization can be then done in the normalizer as for any other HFP operand.

This 'Prealigment' is done on the Dividend, when loaded into the SRT divide processor.

The maximum required shifting is 3 binary digits. The Multiplication function in the SRT processor allows a shift left function when moving the operands from Divisor Register into the Partial Remainder register.

| | | |
|---|---|---|
| No shift | for | load with Tab = 1 |
| SL1 | for | load with Tab = 2 |
| SL2 | for | normal Divide operation with Tab = 1 |
| SL3 | for | normal Divide operation with Tab = 2 |

There is special control logic—mainly a subtractor 74 of 7 bit width—in the divide processor 7, to compute the required shift amount and control the load process in the SRT divide process accordingly.

The calculation of the amount of left shifting is derived from the result of the equation:

$$n\_sl = \text{Mod4}(\text{const} + n\_d - n\_V),$$

wherein 'n_sl' is the number of required left shifts in the range of 0, 1, 2, 3;
'n_d' is the amount of leading '0's of the dividend;
'n_v' is the amount of leading '0's of the divisor;
'const' is a constant is a value that ensures that 'n_sl' is always a positive value, characterized in that the constant is chosen with the value of the width of the fraction operand. The constant is professed chosen with the value of the width of the fraction operand; a constant value of 24 is sufficient for operand with a fraction width of 24, while for 56 wide operands a constant of 56 is required.

This allows normalizing the HFP operand without doing a feedback-loop, which would require only 5 cycles.

with the inventive method hexadecimal divide instructions are running 4 cycles faster. For the DE and the DER instructions this allows a performance improvement from 24 to 20 cycles, which is about 16%.

Commercial Applicability

The invention is commercially applicable particularly in the field of production, test and the operation of integrated chips in a wide field of applications in integrated chip technology since speeding up calculations is a needed technique.

The invention claimed is:

1. Method for calculating a result of a division with a Floating Point Unit with fused multiply add with an A-register and a B-register for two multiplicand operands and a C-register for an addend operand, wherein a divide processor using a subtractive method for calculation with a divisor register and a partial remainder register and a multiplier associated to an subtractor uses the C-register as input, comprising the following steps:

normalization of the dividend and the divisor of the division calculation,
loading the C-register with the bit-normalized dividend and divisor while calculating in parallel a shift correction for alignment of the dividend by a control logic, the method characterized in the following steps:

loading the fraction of the dividend through the divisor register into the partial remainder register of the divide while applying the calculated shifting for alignment by using the multiplier associated to the subtractor,
loading the fraction of the divisor into the divisor register,
performing a division calculation by the divide processor by the required number of iterations,
loading the redundant parts of remainder and quotient into the main adder of the Floating Point Unit and build the explicit raw quotient result, which is already hexadecimal normalized.

2. Method, according to claim 1, wherein the shift correction is a shift to the left in the register by 0 up to 3 bits.

3. Method, according to claim 1,
characterized in that the amount of left shifting is derived from the calculation of the equation:

$$n\_sl = \text{Mod4}(\text{const} + n\_d - n\_V),$$

wherein 'n_sl' is the number of required left shifts in the range of 0, 1, 2, 3;
'n_d' is the amount of leading '0's of the dividend;
'n_v' is the amount of leading '0's of the divisor,;
'const' is a constant is a value that ensures that 'n_sl' is always a positive value.

4. Method, according to claim 3,
characterized in that the constant is chosen with the value of the width of the fraction operand.

5. Method, according to claim 1,
characterized in that the loading the C-register with the bit-normalized dividend and divisor is done by an available feedback path from the normalizer.

* * * * *